United States Patent [19]

Babiol

[11] 4,413,744
[45] Nov. 8, 1983

[54] EXPANDED PLASTIC BOTTLE STOPPER

[75] Inventor: Pierre Babiol, Villefranche sur Saone, France

[73] Assignee: Societe Nouvelle de Bouchons Plastiques S.N.B.P., Anse, France

[21] Appl. No.: 315,074

[22] Filed: Oct. 26, 1981

[30] Foreign Application Priority Data

Dec. 23, 1980 [FR] France ............... 80 27828

[51] Int. Cl.³ ............................ B65D 39/00
[52] U.S. Cl. ............................ 215/355
[58] Field of Search .............. 215/355; 217/110; 220/352, 353

[56] References Cited

U.S. PATENT DOCUMENTS 2,647,283  8/1953  Queor et al. .
2,774,104  12/1956  Miller .
2,925,187  2/1960  Bramming ............... 215/355 X
4,188,457  2/1980  Throp ...................... 215/355 X

FOREIGN PATENT DOCUMENTS 2255384  5/1974  Fed. Rep. of Germany ...... 215/355
703689  2/1954  United Kingdom .

Primary Examiner—Donald F. Norton
Attorney, Agent, or Firm—Dowell & Dowell

[57] ABSTRACT

A bottle stopper made of expanded plastic material and having a cylindrical side wall and transverse end walls, the end walls having a bead portion comprising a rounded peripheral edge curving smoothly into the side wall, and the end walls having concave central depressed portions which expand as the stopper is radially compressed by insertion into a bottle.

1 Claim, 4 Drawing Figures

EXPANDED PLASTIC BOTTLE STOPPER

The present invention relates to improvements in moulds for making articles made of expanded plastics material, and to substantially cylindrical stoppers, and relates to the machines adapted to receive said moulds with a view to producing the articles in question.

The moulding of objects made of expanded plastics material is known to be effected by depositing in a mould a quantity of matter containing foaming agents which act once said quantity is injected in the mould, with a view to completely filling said mould. The volume of matter injected into the cavity of the mould is, of course, much smaller than the volume of said cavity. It is also known that the plastics matter expands without developing high pressures, so that the cavity may be closed by a relatively weak force applied to the opening part of the mould with respect to its fixed part.

U.S. Pat. No. 2,647,283 describes a machine for making briquets of thermo-setting matter by compression. The matter in powder form is introduced into a mould through an opening made in a sliding plate which closes the top of the mould during moulding, said opening also constituting a passage for the finished article. The bottom of the mould is closed by a piston.

U.S. Pat. No. 2,774,104 relates to a machine for making small volumes of pasty matter and for packing same. The only element in common with the present invention resides in the fact that the cavity for moulding is closed by a piston.

British Pat. No. 703,689 describes a machine for moulding thermo-setting or thermo-plastics matters, by means of a pastil making machine of which the cavity is closed by two pistons.

None of these documents relates to a moulding device requiring an injection of matter in the mould.

It is an object of the improvements according to the present invention to enable a mould to be made for producing objects of expanded plastics material, which is inexpensive, simple to operate and which ensures good-quality moulding.

There are two drawbacks when the stopper presents a sharp peripheral edge surrounding its two flat ends:
  to position it, the stopper is firstly compressed radially then pushed into the neck of the bottle so that the pressure of air imprisoned therein increases. This increases is the stronger as the sharp edge of the end of the stopper driven into the bottle rolls up to form a circular sealing lip preventing any evacuation of the imprisoned air. In certain cases, this causes the bottle to burst.
  the residual radial compression which is exerted on the stopper in place causes its corresponding end to swell, which spoils the aesthetics.

The shape of the ends of the stopper made according to the invention enables these two drawbacks to be overcome.

To this end, the mould according to the invention which comprises a bore whose bottom is closed by a piston whilst the top is associated with a closure plate in the form of a perforated sliding plate arranged so that, in a first position, it closes said bore whilst in a second position its perforation comes opposite this bore to allow the moulded article to be ejected, is characterised in that the sliding plate is provided with a second perforation which constitutes a hole for injection of the plastics material, whilst the top of the piston and the bottom of the plate around the injection hole both comprise an element in relief adapted to shape the two ends of the article so that they each present a peripheral bead and a rounded central hollow.

The invention will be more readily understood on reading the following description with reference to the accompanying drawings, in which.

Figure 1:
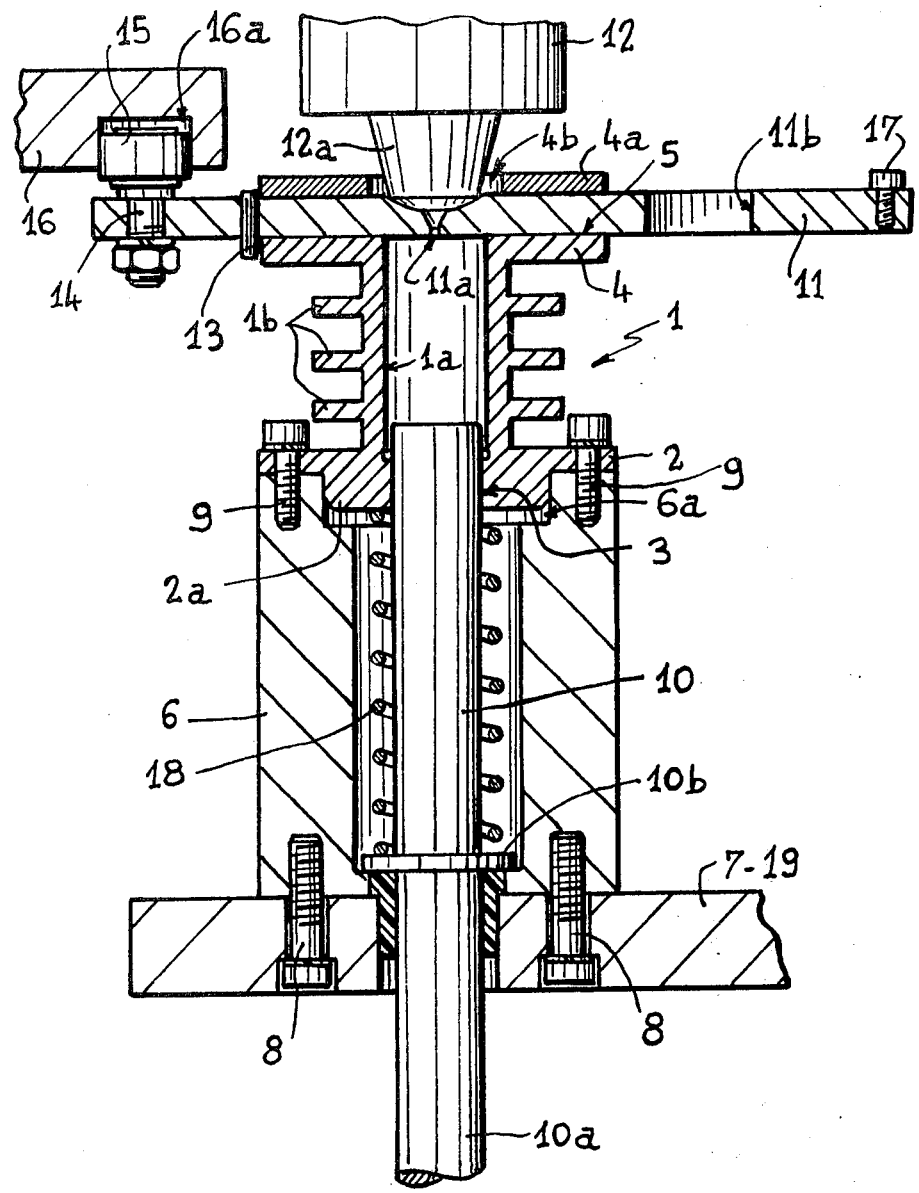
FIG. 1 is a longitudinal section through a mould according to the invention and illustrated in the position of injection of an expanded plastics matter in its cavity.

Referring now to the drawings, FIG. 1 shows a mould 1 comprising a cylindrical inner cavity 1a for making a cylindrical stopper (21) of expanded plastics material. The periphery of the mould 1 is provided with fins 1b for cooling the matter contained in the mould by an air jet sent thereon. The lower part of the mould 1 is provided with a bottom plate 2 comprising a central bore 3. The upper end of the mould 1 is provided with a support 4 comprising a lid 4a fixed on the mould by two screws (not shown) embedded in the support. The cavity 1a is also open at support level as it opens out in a longitudinal passage 5 made in the lid 4a of the support 4. Above the passage 5, this lid 4a comprises a central opening 4b provided to be circular and presenting a diameter considerably larger than that of the cavity 1a.

The bottom plate 2 of the mould 1 is assembled at the top end of a hollow spacer element 6 of which the base is rendered fast with a base 7 via screws 8. The base 7 may be constituted by the circular plate of an injection machine as will be explained in greater detail hereinafter. The mould and the spacer element 6 are assembled by means of screws 9. It is observed that the bottom plate 2 presents a downwardly turned central boss 2a which penetrates without clearance in a recess 6a made in the top of the spacer element 6 so as to centre the latter with respect to the mould.

The diameter of the bore 3 is very slightly less by a few tenths of millimeter than that of the cavity 1a. A plunger 10 constituting ejector penetrates in the bore 3 to close its opening in the cavity 1a. In the example shown, the plunger 10 penetrates slightly in the cavity 1a so as to determine the length of the finished stopper which will be shorter than that of said cavity. Of course, this arrangement enables a stopper of the desired height to be obtained, by altering the length of the plunger.

The passage made in the support 4 is intended to constitute a guide for a slide element 11, in the form of an elongated plate and which is adapted to move in said passage. As illustrated in FIG. 1, the slide element 11 is in moulding position, i.e. it completely closes the top opening of the cavity 1a except for a perforation 11a constituting the hole for introducing the matter. This perforation comprises, in conventional manner, firstly a spherical part adapted to support the nozzle 12a of an injection head 12, followed by an outwardly conical hole 11a for the passage of the matter issuing from said head. The slide element 11 is observed to be provided with a stop 13 ensuring its correct position for the injection phase.

Figure 2:
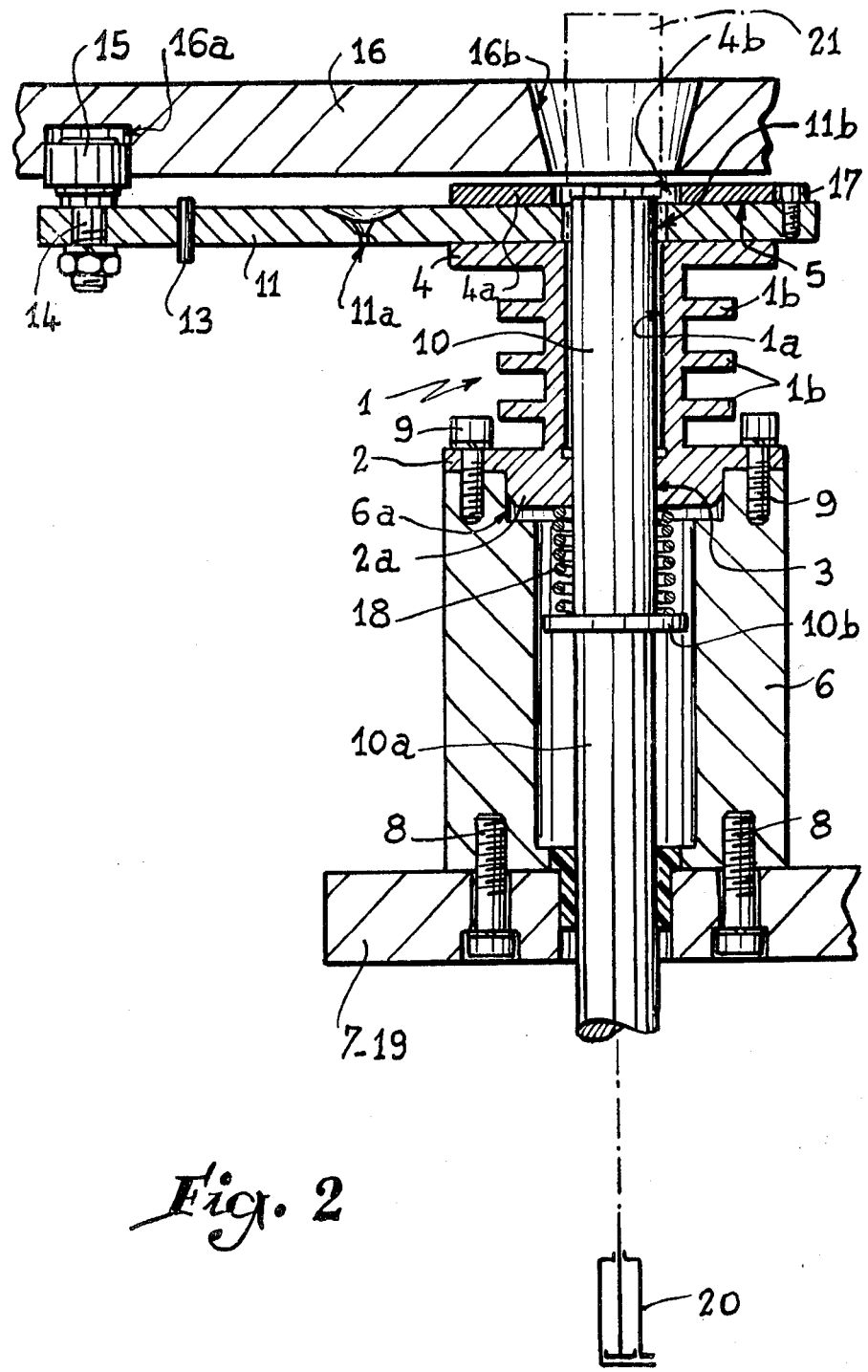
FIG. 2 is a view similar to that of FIG. 1, but the mould is shown in the demoulding position.

In practice, one of the ends of the slide element 11 comprises a vertical pin 14 on which is idly mounted a roller 15 adapted to cooperate with the groove 16a of a cam 16. The shape of the groove in question is such that it ensures the longitudinal displacement of the slide element to take it to the position which it is to occupy, as will be more readily explained hereinafter. It will simply be noted that the slide element in question in provided with a hole 11b of larger diameter than that of the cavity 1a and which is positioned axially with respect thereto to allow the stopper to be ejected once it is cooled. There again, a stop 17 may be provided which is in abutment against the corresponding end of the support 4 with a view to determining the concentricity of the hole 11b and the cavity 1a (FIG. 2).

It will be observed that, in this Figure, the plunger 10 has come completely inside the cavity 1a due to the action of any means on its tail 10a, the displacement in question being made against the reaction of a compression spring 18 placed between the boss 2a of the bottom plate 2 and a flange 10b of the plunger.

Figure 3:
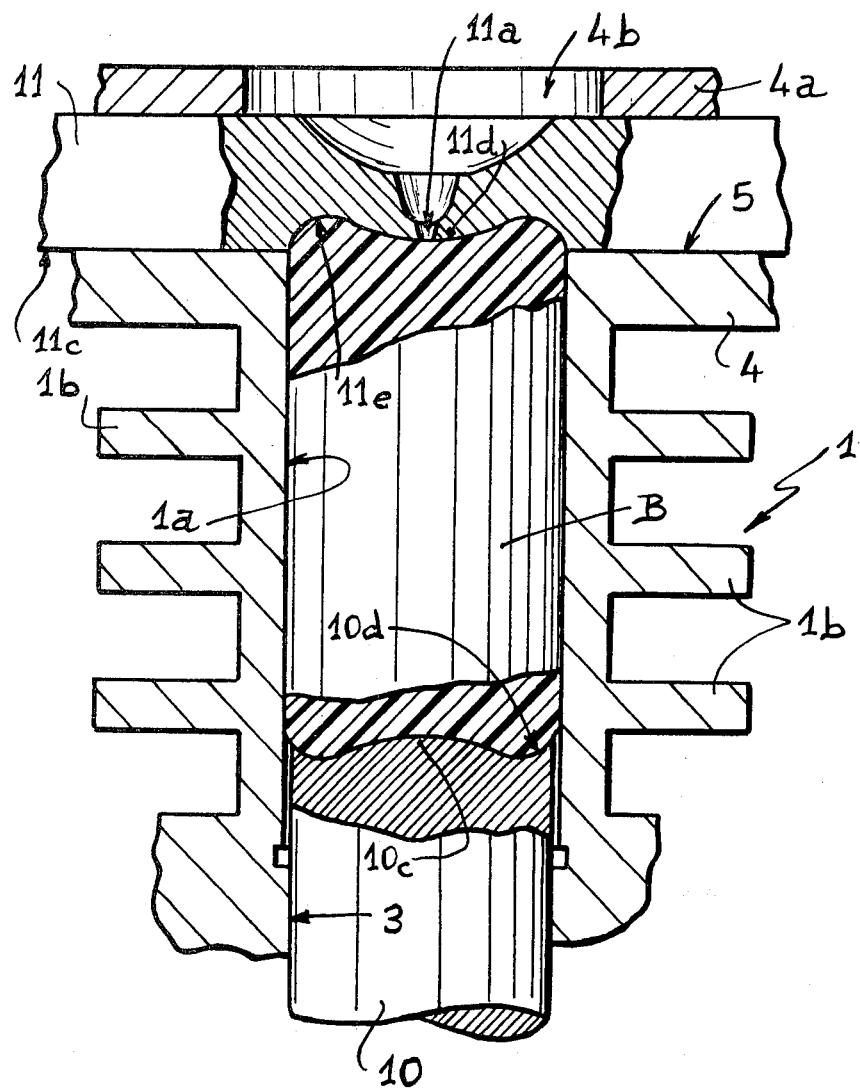
FIG. 3 is a view similar to that of FIG. 1, but illustrating a preferred embodiment and a plastic stopper shown partially in cross section.
Figure 4:
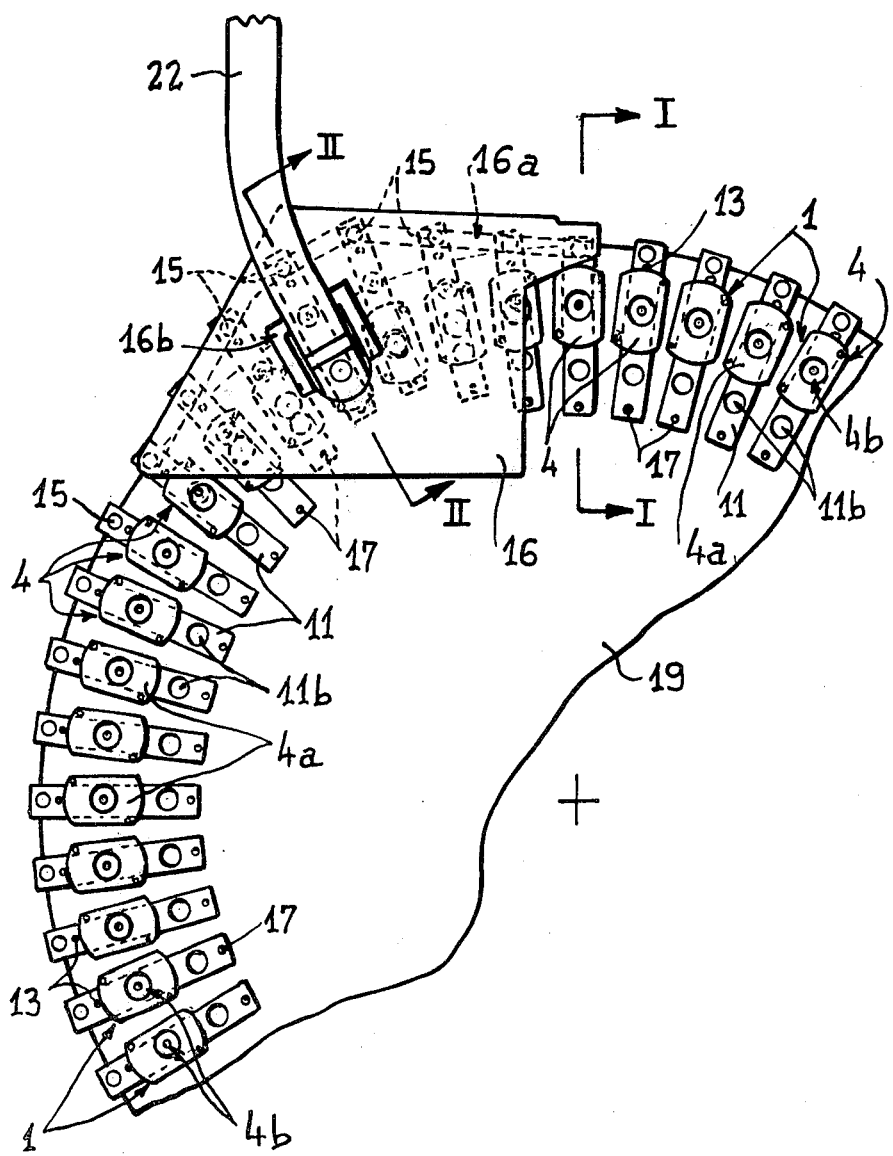
FIG. 4 is a partial plan view of a moulding machine using moulds according to the invention. The planes of section of FIGS. 1 and 2 are shown at I—I and II—II.

According to a preferred embodiment of the preceding arrangement, FIG. 3, the upper end of the piston 10 comprises a central part 10c convex in the direction of the cavity 1a and of which the edges are connected to the periphery of said piston by means of an annular fillet 10d. Similarly, the periphery of the opening of the hole 11a in the lower face 11c of the slide element 11 comprises a relief composed of a central part 11d convex in the direction of the cavity 1a and which is extended by an annular fillet 11e whose diameter of connection with the lower face 11c of the slide element is equal to that of said cavity.

Thus, the stopper B moulded in the cavity 1a of the mould 1 comprises at each of its transverse end surfaces, on the one hand a rounded peripheral bead portion as provided by the surfaces 10d or 11e which facilitates evacuation of the surplus of air or of liquid when it is driven into the neck of the bottle, and on the other hand a rounded concave central depressed portion as provided by the surfaces 10c or 11d which avoids a swell of the outer end of the stopper due to radial compression of the solid body of the stopper.

With a view to mass-producing the stoppers made of expanded plastics material, a large number of moulds according to the invention are arranged on the circular plate 19 of a carousel moulding machine. This machine comprises an injection station (not shown) comprising the injection head 12 mounted on a vertical guide on which it moves in reciprocating manner. The plate is further animated by a jerky rotating movement so that, in position of injection, a mould comes under the head 12 which descends to occupy the position shown in FIG. 1. Its nozzle abuts on the spherical part of the perforation 11a of the slide element 11, then the injection piston of this head pours a certain quantity of matter into the cavity 1a. The head lifts then the plate turns. From that instant, the matter poured into the cavity swells and occupies all the volume thereof. Once this operation is finished, a jet of air is sent onto the moulds to cool the matter.

Towards the end of the cycle, the roller 15 of the slide element of each mould penetrates in the groove 16a of the cam 16, the section of this groove being such that it provokes translation of the slide element from its position of FIG. 1 to that of FIG. 2. When it comes into this latter position, a single acting jack 20 or any other system acts on the tail 10a of the plunger 10 to provoke ejection of the stopper 21 illustrated in dashed and dotted lines in FIG. 2. Of course, the cam 16 comprises, to this end, an opening 16b through which the stopper passes. When it is extracted from the cavity 1, a jet of compressed air is sent to that it is conducted by a chute 22 into a storage element.

As the plate 19 continues to rotate after the plunger 10 has been withdrawn due to the suppression of pressure in the jack 20, the slide element 11 returns to its position due to the appropriate shape of the groove 16a of the cam 16. The mould which is again in the position illustrated in FIG. 1 is ready for a fresh injection and the cycle described hereinabove recommences. When the injection head 12 is lifted after plastics matter has been poured into the cavity 1a, a residue of this matter remains, of course, in the perforation 11a. It will be readily understood that the translation of the slide element 11 ensures separation of this residue with respect to the body of the stopper by shearing this residue at its base. The waste thus obtained is evacuated for example by a jet of compressed air.

What is claimed is:

1. An improved stopper for insertion into the neck opening of a bottle, the stopper having a solid body made of expanded plastic material, and the body having transverse end walls and having a cylindrical side wall of diameter greater than the diameter of the neck opening prior to radial compression of the body by insertion thereof into the neck opening, the improvements including:
    (a) means to facilitate evacuation of surplus air from a bottle when the stopper is driven into its neck opening comprising at least one of the transverse end walls having an end surface surrounded by a bead portion comprising a rounded peripheral edge curving smoothly from the end surface of the transverse wall into the side wall; and
    (b) means to avoid convex swelling of a transverse end wall when the stopper is inserted in a neck opening comprising at least one of the transverse end walls having prior to radial compression of the body a concave central depressed portion which is operative in response to radial compression of the body when inserted into the neck opening of a bottle to fill with displaced plastic material and swell toward the end surface of the transverse wall.

* * * * *